(12) United States Patent
Rotsaert

(10) Patent No.: US 9,946,882 B2
(45) Date of Patent: Apr. 17, 2018

(54) METHOD AND DEVICES TO SECURE THE ENTRY OF AN ALPHANUMERICAL CODE, CORRESPONDING COMPUTER PROGRAM PRODUCT AND STORAGE MEANS

(71) Applicant: Compagnie Industrielle et Financiere D'Ingenierie "Ingenico", Paris (FR)

(72) Inventor: Christopher Rotsaert, Wasquehal (FR)

(73) Assignee: INGENICO GROUP, Paris (FR)

( * ) Notice: Subject to any disclaimer, the term of this patent is extended or adjusted under 35 U.S.C. 154(b) by 1147 days.

(21) Appl. No.: 13/800,195

(22) Filed: Mar. 13, 2013

(65) Prior Publication Data

US 2013/0247213 A1 Sep. 19, 2013

(30) Foreign Application Priority Data

Mar. 13, 2012 (FR) ...................................... 12 52268

(51) Int. Cl.
*G06F 21/60* (2013.01)
*G06F 21/34* (2013.01)
*G09C 1/00* (2006.01)

(52) U.S. Cl.
CPC .............. *G06F 21/60* (2013.01); *G06F 21/34* (2013.01); *G09C 1/00* (2013.01)

(58) Field of Classification Search
CPC ....................................................... G06Q 20/12
See application file for complete search history.

(56) References Cited

U.S. PATENT DOCUMENTS

| | | | | |
|---|---|---|---|---|
| 7,813,822 B1* | 10/2010 | Hoffberg | ............ | G06K 9/00369 381/73.1 |
| 8,316,237 B1* | 11/2012 | Felsher | ................ | H04L 9/0825 380/282 |
| 8,640,944 B1* | 2/2014 | Gazdzinski | ............ | G06Q 10/08 235/375 |
| 2007/0288394 A1* | 12/2007 | Carrott | .................... | G06F 21/10 705/78 |
| 2010/0242104 A1 | 9/2010 | Wankmueller et al. | | |

(Continued)

FOREIGN PATENT DOCUMENTS

| | | |
|---|---|---|
| DE | 102007043843 A1 | 1/2009 |
| WO | 2009069872 A1 | 6/2009 |
| WO | 2010131218 A1 | 11/2010 |

OTHER PUBLICATIONS

French Search Report dated Oct. 29, 2012 for corresponding French Application No. 1252268, filed Mar. 13, 2012.

*Primary Examiner* — Scott S Trotter
(74) *Attorney, Agent, or Firm* — David D. Brush; Westman, Champlin & Koehler, P.A.

(57) ABSTRACT

A method and device are provided for securing entry of an alphanumerical code by a user. The method includes: obtaining, through a first device, information for converting at least one portion of the alphanumerical code into at least one portion of converted code, the information for converting being one-time converting means; a piece of information identifying the information for converting; entering, into a second device distinct from the first device, at least the portion of converted code, converted using the information for converting; and transmitting at least the portion of converted code and the piece of information identifying the information for converting towards a secured server.

10 Claims, 2 Drawing Sheets

(56) References Cited

U.S. PATENT DOCUMENTS

2013/0159021 A1\* 6/2013 Felsher ................ G06F 19/322
                                                                                705/3
2014/0279433 A1\* 9/2014 Holman ................ G06Q 20/12
                                                                                705/39

\* cited by examiner

METHOD AND DEVICES TO SECURE THE ENTRY OF AN ALPHANUMERICAL CODE, CORRESPONDING COMPUTER PROGRAM PRODUCT AND STORAGE MEANS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the entry of a user's alphanumerical code, for example a confidential code (a PIN code or personal identity number), in a bank transaction or in order to access a protected and secured service.

More specifically, the disclosure pertains to a technique for securing such an entry, the confidential code data being sensitive data.

The disclosure can be applied especially but not exclusively to the entry of such codes in non-secured devices such as mobile terminals or payment accessories also called "readers" connected to non-secured devices.

The disclosure is not limited to this particular type of device or to the use of the alphanumerical code.

BACKGROUND OF THE DISCLOSURE

The current large-scale development of payment means using mobile terminals (such as mobile telephones) is making it necessary also to develop appropriate means for securing such transactions, owing to the non-secured character of these terminals unlike "classic" secured transaction terminals.

Indeed, an offer of the possibility of paying for example with one's mobile phone should be accompanied by securing means suited to this mode of payment and especially means for securing the entry of the confidential code, classically used to validate a payment.

Currently, there are known techniques of payment through a mobile terminal using a payment accessory that is connected to the mobile terminal, offering a device that replaces the well-known classic transaction terminal.

This payment accessory connected to the mobile telephone serving as a payment terminal is used for example to read the data of a bank card and transmit this data to the mobile terminal (for subsequent transmission to a secured server for example).

The utility of such a payment accessory lies in its low cost and its ease of use (it can be connected for example through a jack to the audio output of the mobile terminal).

One example of such a payment accessory is illustrated in FIG. 1 in which a payment accessory 10 can be seen, connected to a mobile telephone 11 to enable the reading of a bank card 12.

Then, classically, after having read the data of the bank card through the payment accessory, the mobile telephone asks the user to enter his confidential code at the mobile terminal itself, which does not have the level of security required for bank data.

At present, there are a number of techniques for securing the entry of a confidential alphanumerical code into a non-secured terminal.

For example, there is a technique known as "RevoPIN" described in the patent document WO2010131218_A1, in which a one-time virtual keypad is transmitted to the mobile telephone by a secured server, the keys of the virtual keypad being permutated as compared with a "classic" keypad. This virtual keypad is displayed by the mobile telephone and it is on this virtual keypad that the user enters his PIN code. The code which is then transmitted to the secured server is therefore actually a permutated code, and the secured server can retrieve the original PIN code by means of the one-time virtual keypad that it generates itself for the transaction.

This technique makes it possible to avoid transmitting the user's PIN code to the server but does not give an adequate level of security.

Indeed, since the permutated code information and the virtual keypad are present and therefore potentially accessible on the mobile terminal, the PIN code can be retrieved for example by a malicious application which has access, on the mobile terminal, to these two pieces of information.

Besides, in the case of a PIN code with redundancy of digits, this type of solution gives rise to entropic loss since it is possible, from the permutated code, to deduce the presence and the relative position of the digits of the initial code.

There is therefore a real need to secure these prior-art techniques for entering confidential alphanumerical codes into a non-secured terminal.

SUMMARY

One particular embodiment of the invention proposes a method for securing the entry of an alphanumerical code by a user, implementing the following steps:
  obtaining, through a first device,
    means for converting (or information for converting) at least one portion of said alphanumerical code into at least one portion of converted code, said means for converting being one-time converting means;
    a piece of information for identifying said means for converting;
  entering, into a second device distinct from said first device, at least said portion of converted code, converted by means of said means for converting;
  transmitting at least said portion of converted code and said piece of information for identifying said means for converting towards a secured server.

Thus, the method according to one embodiment of the invention makes it possible to secure the entry of an alphanumerical code, on the one hand by using this converted code and not the user's confidential alphanumerical code and on the other hand by separating, between two distinct devices, the entry in itself and the confidential code conversion.

To this end, the method according to one embodiment of the invention provides for obtaining, on a first device, means for converting the user's confidential code into a converted code which will be effectively entered into the second device. Thus, each of the two devices has access only to either one of the two pieces of information, namely the confidential code and the means for converting, but not both pieces of information, thus ensuring the securing of the entry of the confidential code.

Furthermore, these means for converting, for example in the form of a conversion table, are one-time means. This makes it possible to reinforce security, since the means for converting cannot be "deduced" from a malicious observation of several successive entries of converted codes.

Besides, it is planned to use a means for converting for a complete alphanumerical code or for only a portion of an alphanumerical code.

Thus, for example, according to a first variant, first means for converting are obtained to convert all the characters of an alphanumerical confidential code and new means for converting are obtained for the subsequent entry of another confidential code.

According to another variant, first means for converting are obtained to convert a single character of an alphanumerical confidential code. It is therefore necessary, in this case, to have as many distinct means for converting as there are characters of the alphanumerical code for the complete entry of this code.

According to one particular characteristic, the method for securing implements a step for transmitting at least one portion of converted code towards a secured server.

Thus, the converted code or a portion of the converted code is transmitted to a secured server so as to be processed in a secured way.

In this way, the user's confidential code is not transmitted. Only one converted code is transmitted, and the original confidential code therefore cannot be deduced by an application or a device that does not know the conversion table. The security of the entry of the confidential code is therefore reinforced.

According to one particular characteristic, the step for obtaining obtains also a piece of information for identifying the means for converting and the step for transmitting also transmits the piece of information for identifying the means for converting.

Thus, an identifier is associated with each instance of obtaining of means for converting, this associated identifier making it possible subsequently to know which means for converting have been used for the conversion of the code.

Thus, the transmission to the secured server of this identifier of the means for converting enables the secured server to know all the information needed for the reconstruction of the original confidential code when it receives a converted code.

According to one particular characteristic, the step for obtaining comprises a sub-step for displaying the obtained means for converting.

Thus, the user can convert his confidential code and obtain a converted code in viewing the means for converting displayed on the first device and then entering the obtained converted code into the second device.

According to one particular characteristic, the step for obtaining obtains the means for converting and/or the piece of information for the identifying of the means for converting by the secured server.

Thus, the mechanism for entering the confidential code is secured inasmuch as the processing of the converted code is done within a secured server which alone has knowledge both of the entered (transmitted) converted code and of the means for converting to be used (provided by the secured server itself).

According to one particular characteristic, the means for converting convert a digit into a letter.

In this way, this securing is further improved by eliminating the risk that the user will inadvertently enter his confidential numerical code and not the converted code.

According to one particular implementation, the method for securing comprises, before the step for transmitting, a step for encrypting at least the portion of converted code.

In this particular implementation, the securing of the mechanism for entering the confidential code is further reinforced by the encryption (according to a known method not described in detail herein) of the converted code before it is transmitted to the secured server. Thus, not only is the user's confidential code not transmitted but the converted code is transmitted in encrypted form, further reducing the risk of the original code being obtained by snooping on the entry and on the transmission of the converted code.

According to one particular characteristic, the step for encrypting also implements the encrypting of the information for identifying the means for converting.

In this way, the securing is further improved by not transmitting, in clear or unencrypted form, the identifier of the means for converting used, associated with the transmitted converted code. Neither any piece of information nor any converted code nor any identifier of the means for converting used has to be transmitted in unencrypted form.

According to one particular embodiment, the first and second devices are respectively a device of a merchant involved in a transaction necessitating the entry of the alphanumerical code and a payment accessory connected to the merchant's device.

In this particular embodiment, the merchant's terminal receives means from the secured server for converting an alphanumerical code into a converted code and displays these means so that the user can use them to convert his confidential code entirely or in successive portions into a converted code (or into portions of converted code).

Once his converted code or a portion of converted code has been obtained, the user enters it into a payment accessory connected to the merchant's terminal, this payment accessory having preliminarily served for the reading of the data of the user's bank card for example.

Thus, according to this particular embodiment, the merchant's terminal has no knowledge of the converted code entered in the payment accessory and the payment accessory has no knowledge of the means for converting which are known to and displayed by the merchant's terminal alone.

According to one particular characteristic of this particular embodiment, the means for converting are transmitted to the first device by the second device.

For example, it is the payment accessory that generates a conversion table and transmits it to the merchant's terminal. The payment accessory can then for example encrypt the converted code in including the identifier of the conversion table used and transmit encrypted information to the server enabling it to retrieve the confidential code without any unencrypted information having been transmitted. In this case, it is preferable for the payment accessory to be secured.

According to another particular embodiment, the first and second devices are respectively a payment accessory connected to a device of a merchant involved in a transaction necessitating the entry of the alphanumerical code and the merchant's device.

Thus, according to this particular embodiment, it is the payment accessory that generates and displays the means for converting and it is at the merchant's terminal that the user enters a converted code.

According to yet another particular embodiment, the first and second devices are respectively a mobile terminal of the user involved in a transaction necessitating the entry of the alphanumerical code and a payment accessory connected to a payment device of a merchant involved in the transaction.

In this case, the user's mobile terminal is used to obtain and display the means for converting, and the payment accessory is used to enter the converted code. The level of security is thus heightened through not using the merchant's terminal (which can be compromised) to enter the code.

According to one particular characteristic, the step for transmitting is implemented by the first device or the second device.

Thus, the converted code entered by the user can be transmitted directly by the payment accessory, if it possesses means for transmitting, to the secured server, or else the payment accessory transmits the converted code to the merchant's terminal which forwards them to the secured server.

If the payment accessory does not directly transmit the converted code to the secured server, it is preferable for the payment accessory to encrypt this code before transmitting it to the merchant's terminal.

The invention also pertains to a computer program product which comprises program code instructions for implementing the above-mentioned method (in any one of its different embodiments) when said program is executed on a computer or a processor.

The invention also pertains to a computer-readable and non-transitory storage medium storing a computer program comprising a set of instructions executable by a computer or a processor to implement the above-mentioned method (in any one of its different embodiments).

In another embodiment of the invention, a device is proposed for securing the entry of a user's alphanumerical code implementing the method for securing mentioned here above (in any one of its different embodiments).

Advantageously, the securing device comprises means for implementing steps that it performs in the method as described here above in any one of its different embodiments.

The invention also pertains to a payment accessory implementing the method for securing mentioned here above (in any one of its different embodiments).

Advantageously, the payment accessory comprises means for implementing the steps that it performs in the method as described here above in any one of its different embodiments.

BRIEF DESCRIPTION OF THE DRAWINGS

Other characteristics and features shall appear from the following description, given by way of an indicatory and non-exhaustive example and from the appended drawings, of which.

DETAILED DESCRIPTION OF ILLUSTRATIVE EMBODIMENTS

1. General Principle

The general principle of an exemplary embodiment of the invention relies on the separation, between two distinct devices, of means for converting an alphanumerical code into a converted code (referred to as information for converting) and means for entering the converted code, thus reinforcing the security of the entry of a confidential alphanumerical code for example.

For the sake of simplification, here below in the description we use the example of means for converting (or information for converting) that take the form of a conversion table.

It is clear that the technique presented here below, according to different embodiments of the invention, is not limited to this example of means for converting.

2. Description of a First Embodiment of the Invention

Figure 1:
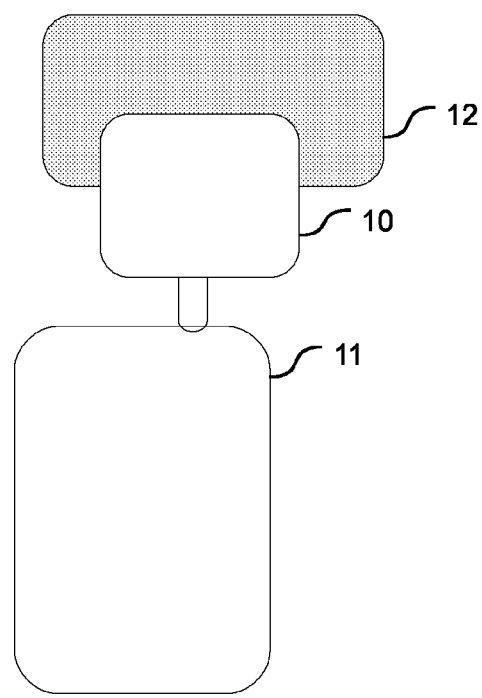
FIG. 1, already described with reference to the prior art, shows an example of a payment accessory connected to a mobile terminal.
Figure 2:
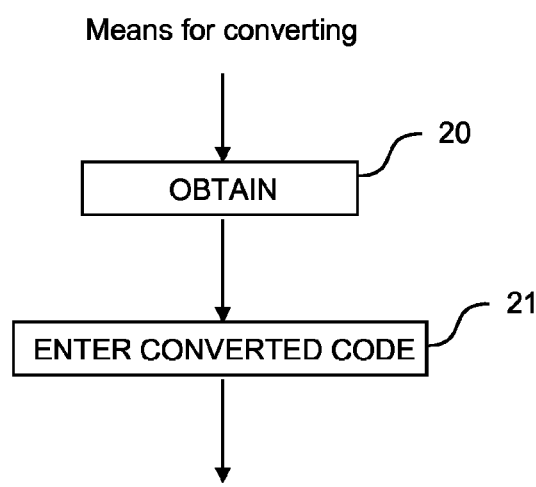
FIG. 2 illustrates the main steps of the securing method according to one particular embodiment of the invention.
Figure 3:
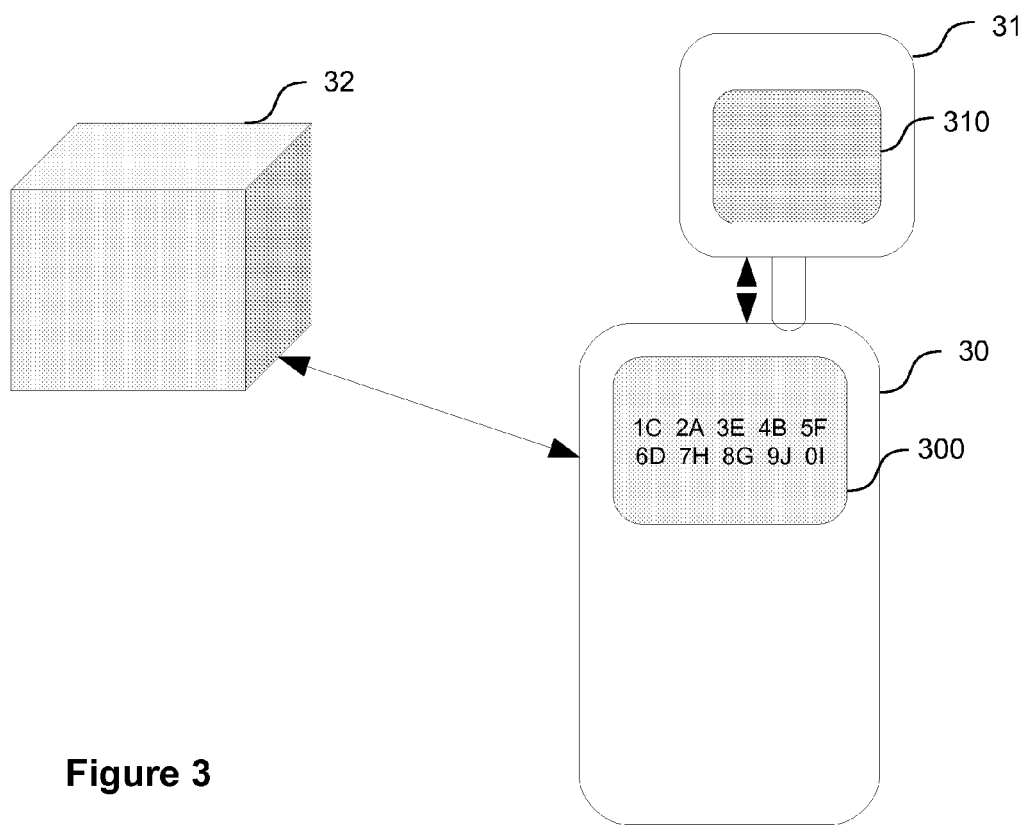
FIG. 3 presents an example of a system in which the method according to one embodiment of the invention is implemented.

Referring now to FIGS. 2 and 3, we present the main steps of the method for securing the entry of alphanumerical code, as well as an example of a system in which the invention can be implemented according to one embodiment of the invention.

In this particular embodiment, these means for converting are obtained for converting an entire alphanumerical code. A variant described in the next sub-section 6.3 enables the conversion of portions of an alphanumerical code.

In this embodiment, a step 20 for obtaining means for converting (for example a conversion table) is implemented so as to enable the user to convert his confidential alphanumerical code into a converted code.

This step 20 for obtaining is implemented in a first device, for example and as illustrated in FIG. 3 the merchant's mobile terminal 30 on which the transaction is implemented. It is indeed increasingly frequent for a merchant to have to use his mobile terminal to implement the transactions instead of having a specific transaction terminal at his disposal.

In this example, the conversion table is transmitted to the merchant's mobile terminal 30 by the secured server 32 in charge of validating the transaction.

According to a second variant, not illustrated, the first device can be the payment accessory 31 or else again a mobile terminal of the user.

Once the conversion table has been obtained at the step 20 by the first device, this device displays it on a screen 300 for example, so that the user can access it. The user then converts his alphanumerical confidential code into a converted code and enters the converted code, during a step 21, in a second device.

For example, and as illustrated in FIG. 3, the second device corresponds to the payment accessory 31 connected to the merchant's mobile terminal 30.

The second device comprises means 310 for entering the converted code, for example in the form of a keypad or a printed resistive pad. This alternative makes it possible especially to reduce the cost of implementation and to use this same surface to enter the converted code and to enter a signature of the user (a common function for a payment accessory).

Thus, according to this embodiment, the merchant's mobile terminal has knowledge only of the conversion table and the payment accessory has knowledge only of the converted code so that the entry of the code by the user is highly secured.

Indeed, a same device involved in the method according to this embodiment of the invention, whether it is the merchant's mobile terminal or the payment accessory, does not have knowledge of both pieces of information (the conversion table and the entered converted code) needed to rebuild the initial code. A spy application or "snooper" application in either of these devices would therefore not be able to retrieve the initial code unlike in the prior-art techniques.

A conversion table is made for example by associating a digit with a character as illustrated in FIG. 3. One valuable aspect of this particular mode of implementation lies in the conversion of a numerical code into a code formed by letters, thus eliminating the risk that the user might inadvertently enter his real numerical confidential code. In this case, the keypad 310 of the payment accessory therefore has for example only letters and not digits.

Once the converted code has been entered by the user into the second device, this device transmits it to the secured server 32.

This transmission can be implemented according to a first variant directly by the payment accessory if it has such transmission means available. This variant makes it possible especially not to introduce any intermediary into the transmission and therefore to maintain an optimum level of security.

According to a second variant, especially when the payment accessory does not have means for transmission towards the secured server, the converted code is first of all transmitted by the payment accessory 31 to the merchant's mobile terminal 31 which then transmits the converted code to the secured server.

According to another particular aspect of this first embodiment, the converted code entered by the user in the payment accessory 31 is encrypted (according to a known method that is not described in detail here) by the accessory and then transmitted to the secured server 32. Indeed, the payment accessory is capable of encrypting data such as the data read by the bank card, and it would be a good idea to use this capacity to further reinforce the security of the entry of the code. Thus, not only is the entry of the converted code separated from the conversion table, between two distinct devices, but also the converted code is transmitted to the secured server not as is but in an encrypted form that can be decrypted only by the secured server (and the payment accessory).

Besides, in order that the secured server can retrieve the initial alphanumerical code, it must also have knowledge of the conversion table used to obtain the converted code that it has received.

Thus, the transmission of the converted code must be accompanied by the transmission of a piece of information by which this conversion table can be retrieved, for example a piece of information identifying the conversion table.

In this embodiment of the invention, with the conversion table being transmitted to the merchant's mobile terminal 30 by the secured server 32, this server also transmits a piece of information for identifying the conversion table. This piece of information is then re-transmitted to the server with the associated converted code.

In the variant described here above, in which the converted code is encrypted by the payment accessory, the merchant's mobile terminal can transmit the identifier of the conversion table to the payment accessory without transmitting the table itself, so that the payment accessory also encrypts this information for identifying the conversion table. In this case, only encrypted information, namely the encrypted converted code and the identifier of the encrypted conversion table, is transmitted to the server 32. These two pieces of information can, if necessary, be combined into a single piece of encrypted data.

Besides, as already indicated here above, in this embodiment a conversion table is obtained in order to convert an entire alphanumerical code and another conversion table is generated subsequently to convert another alphanumerical code.

For example (as illustrated in FIG. 3), a numerical code formed by four digits "1234" is converted into a converted code with four characters "CAEB".

A conversion table is therefore a one-time table thus reinforcing the security of the method according to an embodiment of the invention. Indeed, a malicious observer cannot deduce the initial code by observing several successive entries of a converted code, the conversion table being different at each use.

3. Description of a Second Embodiment of the Invention

According to this second embodiment, which is not illustrated, a conversion table is obtained to convert a portion of an alphanumerical code and not an entire alphanumerical code.

In this case, several conversion tables are obtained successively to convert an entire code.

This embodiment averts the entropic loss related to an alphanumerical code formed by several identical characters, which would be converted into a converted code formed by several identical characters if only one table were to be used to convert all the characters of the code.

Thus, if we consider a table for converting a digit into a letter, one example of which is illustrated in FIG. 3, and a numerical code formed by four characters, four conversion tables are obtained successively to convert the entire numerical code.

For example, we consider a numerical code formed by four digits "1234" to be converted by means of the following four successive conversion tables:

1C 2A 3E 4B 5F 6D 7H 8G 9J 0I: enables <<1>> to be converted into <<C>>, 1J 2B 3G 4I 5A 6H 7C 8D 9E 0F: enables <<2>> to be converted into <<B>>, 1A 2J 3B 4E 5C 6F 7D 8H 9I 0G: enables <<3>> to be converted into <<B>>, 1I 2J 3G 4H 5D 6F 7B 8E 9A 0C: enables <<4>> to be converted into <<H>>.

The code "1234" is therefore converted into "CBBH".

According to a first variant of this embodiment, each letter of the converted code can be transmitted to a secured server, one at a time, accompanied by a piece of information identifying the conversion table used.

According to a second variant, the entire converted code is transmitted to the secured server once the four figures of the initial code have been converted, along with the identifiers of the four conversion tables used.

Figure 4:
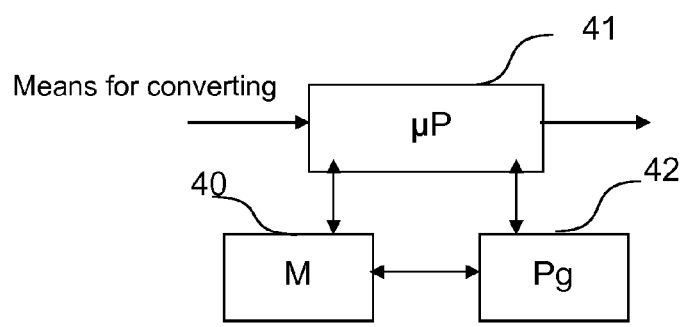
FIG. 4 presents the structure of a securing device according to one particular embodiment of the invention.

4. Example of a Device of a Securing Structure According to the Embodiment of the Invention FIG. 4 presents the structure of a device 30 for securing the entry of an alphanumerical code according to one particular embodiment of the invention. This device implements the technique presented here above (in any one of the embodiments presented with reference to FIGS. 2 and 3).

In this example, the device comprises a RAM (random-access memory) 40, a CPU (central processing unit) 41, equipped for example with a processor and driven by a computer program stored in a ROM (read-only memory) 42. At initialization, the instructions of the computer program code are for example loaded into the RAM 40 and then executed by the processor of the processing unit 41. The processing unit 41 obtains means for converting at least one portion of an alphanumerical code into at least one portion of converted code, according to the instructions of the program 42, in order to implement the technique presented here above (in any one of its embodiments).

This FIG. 4 illustrates only one particular way, among several possible ways, of carrying out the technique presented here above.

An exemplary embodiment of the invention thus provides a technique for securing the entry of a confidential alphanumerical code by which it is possible to greatly reduce or even prevent risks of spying or snooping on such an entry in an environment that is not entirely secured.

An embodiment of the invention provides a technique of this kind that does not require any device other than those at the merchant's disposal, for example his mobile telephone and a connected payment accessory.

An embodiment of the invention provides a technique of securing making it possible to have access to sensitive data (for example a confidential code) only on a secured device, for example a secured server.

An embodiment of the invention provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:
   securing entry of an alphanumerical code, wherein securing entry comprises the following acts:
   receiving from a secured server, by a first device,
      at least one conversion table for converting at least one portion of said alphanumerical code into at least one portion of converted code, said at least one conversion table being a one-time conversion table; and
      an identifier of the at least one conversion table;
   displaying the at least one conversion table on a display of the first device;
   converting, by using the at least one conversion table, the at least one portion of the alphanumerical code into the at least one portion of converted code;
   entering the at least one portion of converted code, into a second device distinct from said first device, wherein the first device has access to the at least one conversion table and not to the at least one portion of converted code, and wherein the second device has access to the at least one portion of converted code and not to the at least one conversion table; and
   transmitting the at least one portion of converted code and the identifier of the at least one conversion table to the secured server, the transmitting providing the secured server access to all information needed for reconstruction of the alphanumerical confidential code.

2. The method according to claim 1, wherein the method comprises, before said act of transmitting, an act of encrypting the at least one portion of converted code.

3. The method according to claim 2, wherein said act of encrypting also implements encrypting said identifier.

4. The method according to claim 1, wherein said first and second devices are respectively a device of a merchant involved in a transaction necessitating entry of said alphanumerical code and a payment accessory connected to said device of said merchant.

5. The method according to claim 1, wherein said first and second devices are respectively a payment accessory connected to a device of a merchant involved in a transaction necessitating entry of said alphanumerical code and said device of said merchant.

6. The method according to claim 1, wherein transmitting comprises:
   transmitting said at least one portion of converted code from the second device to the secured server, and transmitting said identifier from the first device to the secured server.

7. The method according to claim 1, wherein transmitting comprises:
   encrypting, by the second device, said at least one portion of converted code to produce an encrypted portion of converted code, transmitting said encrypted portion of converted code from the second device to the first device, and then transmitting the encrypted portion of the converted code and said identifier from the first device to the secured server.

8. The method according to claim 1, wherein transmitting comprises:
   transmitting said identifier from the first device to the second device, and then transmitting said at least one portion of converted code and the identifier from the second device to the secured server.

9. A computer-readable and non-transitory storage medium storing a computer program comprising a set of instructions executable by a computer or a processor to implement a method, wherein the method comprises:
   securing entry of an alphanumerical code, wherein securing entry comprises the following acts:
   receiving from a secured server, by a first device on which the instructions are executed,
      at least one conversion table for converting at least one portion of said alphanumerical code into at least one portion of converted code, said at least one conversion table being a one-time conversion table; and
      an identifier of the at least one conversion table;
   displaying the at least one conversion table on a display of the first device;
   receiving from a second device, distinct from said first device, an encrypted portion of converted code, which corresponds to the alphanumeric code converted to the at least one portion of converted code by the user and entered into and encrypted by the second device, wherein the first device has access to the at least one conversion table and not to the at least one portion of converted code unencrypted, and wherein the second device has access to the at least one portion of converted code and not to the at least one conversion table; and
   transmitting at least said encrypted portion of converted code and the identifier to a secured server.

10. A system for securing entry of an alphanumerical code by a user, wherein the system comprises:
    a first device, comprising:

a display;
means for receiving from a secured server:
  at least one conversion table for converting at least one portion of said alphanumerical code into at least one portion of converted code, said information for converting being a one-time conversion table; and
  an identifier of said at least one conversion table; and
means for displaying the at least one conversion table on the display; and
a second device, distinct from the first device and comprising:
  means for entering at least said portion of converted code, converted by the user using said at least one conversion table displayed on the display of the first device, wherein the first device has access to the at least one conversion table and not to the at least one portion of converted code, and wherein the second device has access to the at least one portion of converted code and not to the at least one conversion table; and
means for transmitting the at least one portion of converted code and the identifier of the at least one conversion table to the secured server, the transmitting providing the secured server access to all information needed for reconstruction of the alphanumerical confidential code.

* * * * *